United States Patent  [15] 3,668,468
Kornrumpf et al.  [45] June 6, 1972

[54] SOLID STATE CIRCUITS FOR GUARANTEED SEQUENTIAL FLASHING OF PHOTOFLASH LAMP ARRAY

[72] Inventors: William P. Kornrumpf, Schenectady, N.Y.; Paul T. Cote, Cleveland Heights, Ohio

[73] Assignee: General Electric Company

[22] Filed: Dec. 16, 1968

[21] Appl. No.: 793,636

[52] U.S. Cl. ............................315/323, 315/151, 315/153, 315/322, 431/95
[51] Int. Cl. ...............G03b 15/04, H05b 37/04, H05b 41/34
[58] Field of Search..................315/323, 317, 318, 319, 323, 315/329, 325, 65, 87, 151–154; 431/95; 95/11 L, 11.5 R

[56] References Cited

UNITED STATES PATENTS

| | | | |
|---|---|---|---|
| 3,518,487 | 6/1970 | Tanaka et al. ..........................317/232 |
| 3,488,558 | 1/1970 | Grofton ..................................315/312 |
| 3,486,068 | 12/1969 | Dunn et al. ...............................315/87 |
| 2,398,771 | 4/1946 | Compton................................315/323 |

*Primary Examiner*—John W. Huckert
*Assistant Examiner*—William D. Larkins
*Attorney*—Norman Fulmer, Henry P. Truedell, Joseph B. Forman, Frank L. Neuhauser and Oscar B. Waddell

[57] ABSTRACT

A solid state guaranteed flash circuit for sequentially flashing a linear array of n photoflash lamps employs solid state thyristors in series with the lamps that are turned on sequentially following actuation of the shutter release in a time interval a magnitude less than the shutter opening, the sequencing being interrupted when a lamp is fired. A series current sensing impedance in combination with a thyristor senses the application of current to a continuous filament, while a second current or light sensing thyristor senses the flashing of good lamps. Either sensor can interrupt and reset the series RC gating circuits for the lamp circuit thyristors, but the first is released after a predetermined interval sufficient to sense a good lamp. When a shorted-circuited lamp or air lamp is sensed, the timing cycle restarts and the next lamp in the array is flashed while the shutter is still open.

14 Claims, 5 Drawing Figures

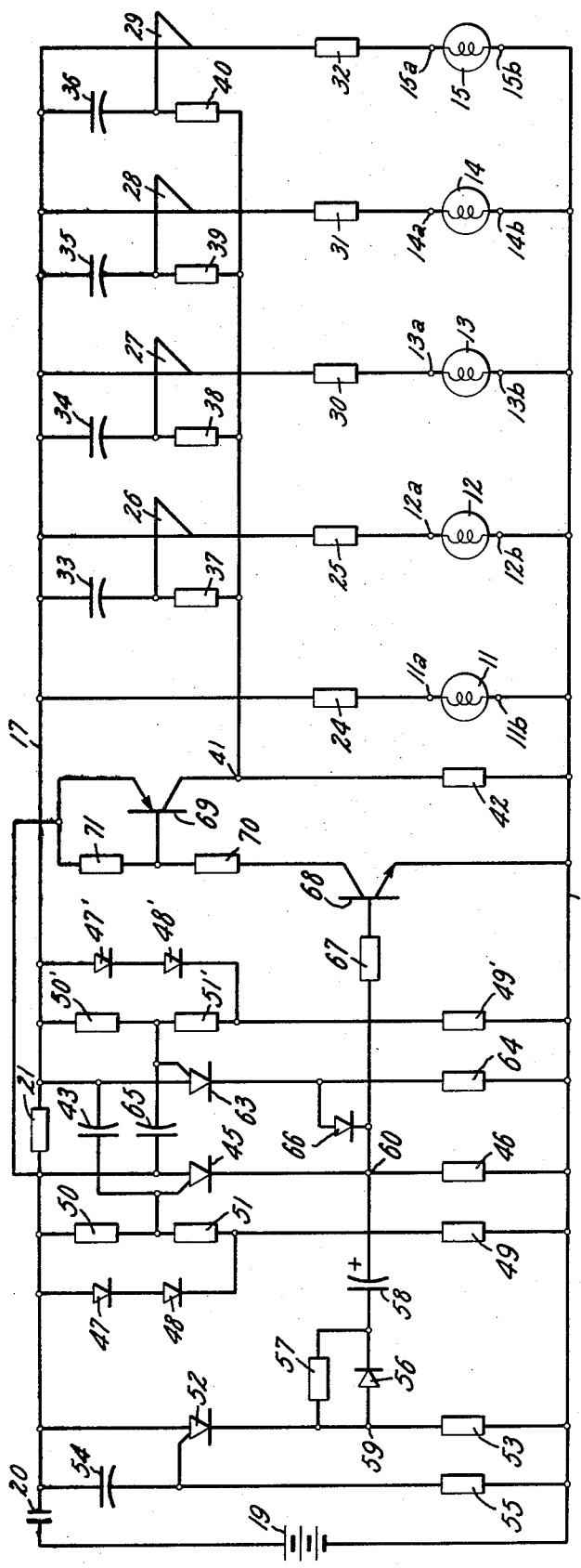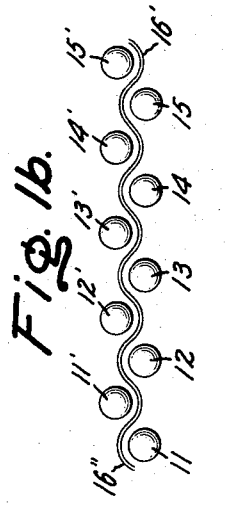

Inventors:
William P. Kornrumpf,
Paul T. Coté,
by Ronald R. Campbell
Their Attorney.

SOLID STATE CIRCUITS FOR GUARANTEED SEQUENTIAL FLASHING OF PHOTOFLASH LAMP ARRAY

This invention relates to solid state circuits for sequentially flashing or firing an array of photoflash lamps to supply artificial light when taking a series of photographs with a camera. More particularly, the invention relates to relatively low cost circuits of this type that can be fabricated as monolithic or hybrid integrated circuits, and are designed to automatically by-pass defective lamps and flash a good lamp without losing the exposure.

In order to expose a plurality of frames of photographic film under conditions requiring artificial light without the need of manually replacing each burned out flashbulb with an unused bulb each time a picture is taken, it has been proposed to arrange several flashbulbs or lamps in a unitary package and mechanically or electrically switch from one lamp to another between frames. The presently popular flash cube system is mounted on the camera and comprises four flashbulbs and their reflectors facing toward the four sides of the cube, with provision for turning the cube as the film advance is actuated to put a new bulb in position to be fired. In another system there is a linear array of stationary flash lamps, with the switching between lamps being accomplished by an electromechanical stepping relay. Due to the relatively slow speed of switching from one lamp to the next in the array, all of these prior art approaches result in an improper exposure or losing the picture completely when the flash lamp is faulty because of internal defects. Bad lamps have defects such as a short circuited connection, an open circuit, or a non-hermetically sealed bulb known as an air bulb that produces no usable light output. In addition to ruining the frame of film, the particular pose or subject matter being photographed sometimes cannot readily be recaptured. Another disadvantage of a system tied to the film advance is that special effects obtained by double exposing a film frame cannot be employed.

The advent of the fabrication of electronic circuits by integrated circuit techniques, in conjunction with the availability of a variety of high speed solid state switching devices such as thyristors, as well as the older transistor, provide opportunities for improvements in multiple photoflash lamp firing circuits. Improved all electronic firing circuits can be manufactured at a cost competitive with the slower electromechanical systems, and possess all the known advantageous features of integrated circuits such as small size and increased reliability. Moreover, the new flashing circuits can utilize the high speed of solid state static switching device components to include supplementary capabilities, such as a guaranteed flash despite the presence of faulty lamps. Because of their compact size, the new flashing circuits can readily be built into the camera as a permanent feature, or can be packaged separately in a plug-in flash accessory that can readily be carried in an accessory case and installed when needed.

Accordingly, an object of the invention is to provide new and improved high speed solid state circuits for flashing an array of photoflash lamps in sequence without losing a picture despite the presence of one or more defective lamps.

Another object is to provide new and improved solid state sequencing flash lamp firing circuits for a linear array of photoflash lamps that are adapted to be manufactured as monolithic or hybrid integrated circuits and are operated by the camera shutter release.

Yet another object is the provision of high speed solid state multiple flash lamp firing circuits that automatically sense all defective lamps and flash a good lamp during the time that the shutter is open without losing the exposure.

A further object is to improve the performance of a photographic camera with flash capability by means of fast acting sequential flash lamp firing circuits that are coordinated with the shutter release and can supply a guaranteed flash.

In accordance with the invention, a solid state guaranteed flash circuit for sequentially flashing an array of photoflash lamps comprises a plurality of lamp circuits each including solid state switching means in series with a pair of lamp terminals for receiving a photoflash lamp, said lamp circuits being connected parallel to one another between a pair of power supply terminals for connection across a source of unidirectional electric potential and in series with a shutter switch that closes to energize the circuit following actuation of the shutter release and remains closed substantially during the interval that the shutter is open. Control means are provided to render conductive the solid state switching means in a predetermined sequence following the closing of the shutter switch during a timing cycle substantially shorter than the shutter open interval. First current sensing means senses the application of current to the first lamp in the array having a continuous filament, and second sensing means senses the flashing of a good lamp. Inhibit and release means are responsive to either of the first and second sensing means for inhibiting said control means and interrupting the sequencing of said solid state switching means, and is operative to release the control means after a predetermined interval of time sufficient to sense the flashing of a good lamp when current is supplied to a defective lamp filament. In this manner the sequencing recommences, and current is supplied to the next continuous lamp filament in the array while the shutter remains open, preventing loss of an exposure.

The foregoing and other objects, features, and advantages of the invention will be apparent from the following more particular description of several preferred embodiments of the invention, as illustrated in the accompanying drawings wherein:

FIG. 1a is a sketch showing a front view of a linear array of five photoflash lamps with their reflector;

FIG. 1b shows an array of 10 lamps with nested reflectors;

FIG. 2 is a schematic circuit diagram of a sequential firing circuit for a linear array of photoflash lamps including a current sensing feature to guarantee a flash despite the presence of one or more faulty lamps; and that is further adapted to be fabricated as an integrated circuit;

Figure 4:
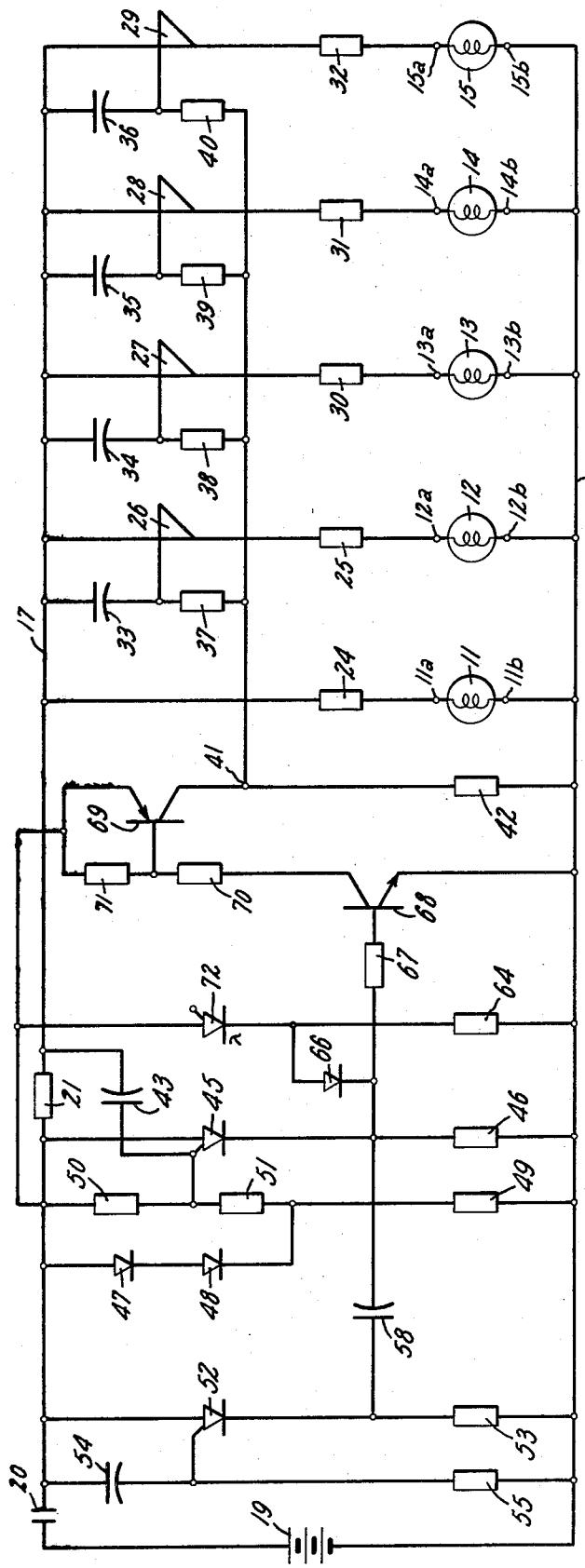
FIG. 4 is a modification of the guaranteed flash circuit of FIG. 2 utilizing light sensing to sense the flashing of a good lamp.

The guaranteed or warranteed flash sequential flashing circuit is preferably used with a linear array of photoflash lamps of the type shown in FIG. 1a or 1b. In FIG. 1a there is illustrated by way of example a row of five lamps identified by numerals 11–15 mounted adjacent one another in front of a dimpled reflector 16. The array in FiG. 1b comprises a total of ten lamps 11–15 and 11'–15' arranged in two parallel staggered rows of five lamps each with two nested undulated reflectors 16' and 16'' threaded between the two rows. With the latter arrangement, one row of lamps is fired sequentially, and the array is manually turned around for the flashing of the other row of lamps in sequence.

Referring now to the guaranteed flash sequential firing circuit shown in FIG. 2, the photoflash bulbs 11–15 are removably plugged either singly or as a unitary array into pairs of terminals respectively comprising a portion of five series lamp circuits connected in parallel with one another between a pair of d-c supply terminals 17 and 18 that are adapted to be connected across a source of unidirectional electric potential such as a battery 19. The energization of the guaranteed flash circuit is coordinated with the opening of the camera shutter which is initiated by the user pressing the camera release when it is desired to take a picture. For this purpose, a pair of physically separable electric contacts 20 or other suitable type of shutter switch is connected between the positive d-c power supply terminal 17 and the battery 19. The contacts 20 are normally open and are closed either directly or indirectly with or without a time delay as a result of actuating the shutter release member. The invention is not limited to a particular type of camera or shutter system, and can be used with either a diaphragm shutter or a focal plane shutter. The closing of the contacts 20 is timed to coincide with the start of the shutter opening, however other types of synchronization can be accommodated. A current sensing resistor 21 whose function will be explained later is connected in series in the d-c supply terminal 17 between the contacts 20 and the parallel lamp circuits containing the lamps 11–15.

These five lamp circuits are arranged to flash their respective lamps in time sequence measured from the closing of the contacts 20. In the interest of reducing the cost, the first lamp circuit including the lamp 11 comprises simply a resistor 24 in series with the pair of lamp terminals 11a and 11b between which the filament of the lamp 11 is effectively coupled, so that current is supplied to the lamp 11 to ignite its filament immediately upon the closing of the contacts 20. The second through fifth lamp circuits, however, each include a solid state switching device, and preferably a thyristor type solid state switching device or devices having a latching characteristic, to control the time at which the respective lamp circuits are rendered conductive. Thus, the lamp terminals 12a and 12b are connected in series with a resistor 25 and a silicon unilateral switch thyristor switching device 26 having its anode electrode connected to the d-c positive supply terminal 17. In like manner, the correspondingly numbered terminals for the photoflash lamps 13, 14, and 15 are respectively connected in series with silicon unilateral switch devices 27–29 and resistors 30–32.

The silicon unilateral switch (SUS) is actually a small monolithic integrated circuit having thyristor electrical characteristics closely approaching those of an ideal four-layer diode. Usually, the device is switched from its blocking high impedance condition to its low impedance conductive state by applying to the anode a potential which is more positive than that at the cathode and exceeds a critical value. The silicon unilateral switch does, however, have a gate electrode which can be used to obtain triggering at lower voltages, and it is this mode of gating that is used in this application. Within the small integrated circuit that comprises the silicon unilateral switch, the anode and gate electrodes are connected respectively to the emitter and base electrodes of a p-n-p transistor which must be forward biased in order to render the switch conductive. Thus, the device can be turned on by applying to the gate electrode a potential which is negative with respect to the anode potential and exceeds one diode drop, about 0.6 volt for a silicon device. This is known as anode gating. A suitable silicon unilateral switch that can be used is the GE 2N4990, and this device is further described in specification sheet No. 65.26, dated March 1967, obtainable by writing to the General Electric Company, Semiconductor Products Department, Electronics Park, Syracuse, N.Y. The gating circuits for the silicon unilateral switches 26–29 comprise four series RC timing circuits that are connected in parallel with one another between the d-c supply terminals 17 and 18 and have different time constants. The four gating circuits more specifically include four capacitors 33–36 connected between the positive d-c supply terminal 17 and the gate electrode of its respective device, four resistors 37–40 connected between its respective gate electrode and a common junction point 41, and a common resistor 42 connected between the junction point 41 and the negative d-c supply terminal 18. The common resistor 42 has a substantially lower value than the resistors 37–40 so that the time constants of the gating circuits are effectively determined by the values of the capacitors 33–36 and the resistors 37–40. To analyze the manner in which the silicon unilateral switch 26 is gated into conduction, it is seen that upon closing the shutter contacts 20, the capacitor 33 begins to charge down from approximately the value of the source 19 through the resistors 37 and 42. When the voltage across the capacitor 33 exceeds one diode drop, or about 0.6 volt, SUS 26 is rendered conductive and supplies current through the resistor 25 to the lamp 12. At the same time the other timing capacitors 34–36 are charging down through their respective series connected resistors, but the time constants of these three timing circuits are respectively longer so that, assuming that the timing sequence is uninterrupted, the SUS devices 27–29 are rendered conductive sequentially. As will be explained in greater detail later, the flashing of a good photoflash lamp is sensed and the time sequencing for the remaining lamps is stopped so that the other lamps are not fired. It will be noted that it is not necessary to provide a commutation circuit for the SUS devices 26–29 to turn them off once having been turned on, since normally the burning out of the lamp filament opens the lamp circuit and turns off its respective device. Should one of the lamps 12–15 become short-circuited after flashing, its respective SUS device will in any event be commutated off when the shutter contacts 20 are opened. It is, of course, always necessary to open the contacts 20 before reclosing them to take another exposure.

When a flash exposure is taken, the shutter typically remains open for about one-thirtieth of a second or roughly 30 milliseconds. The time constants of the gating circuits for the SUS devices 26–29, on the other hand, are chosen to be typically in the 0.1 to 1 millisecond range and thus are in excess of a magnitude faster. In the event that a defective lamp is fired or attempted to be fired, It is possible because of the rapidity of the time sequencing to fire the next lamp in the sequence while the shutter is still open, preventing loss of the exposure. The guaranteed flash circuit is adapted to be fabricated as a monolithic or hybrid integrated circuit. In view of the fact that the circuit is mounted within the camera housing, or alternatively in a flash accessory housing that is plugged onto the camera or electrically coupled with it when it is desired to take a flash picture, it is nevertheless desirable in the interest of minimizing the required space that the timing capacitors 33–36 be relatively small. Preferably, the resistors 37–40 all have the same value, while the timing capacitors 33–36 have different values and increase in capacitance in that order. Suitable results are produced for a battery 19 of about 6 volts when the timing capacitors are respectively 0.01, 0.033, 0.05, and 0.1 microfarads, the charging resistors 37–40 are 20 K ohms each, and the common charging resistor 42 is 1.2 K ohms.

As has been pointed out, there are three kinds of defective lamps. The first is the open circuited or burned-out lamp. The second is the short-circuited lamp which ignites and produces a usable output, but becomes permanently short circuited after flashing when the molten material falls on the filament holders and solidifies. The third is the non-hermetically sealed or air lamp which acts electrically like a good lamp but takes a longer time to burn out and does not produce a usable light output. Before describing the circuit components that sense the short-circuit lamps and air lamps, and sequence the circuit to the next good bulb to produce a flash, it will be instructive to review the basic operation of the lamp circuits assuming that all of the lamps 11–15 are good lamps or open circuited lamps. In order to interrupt the time sequencing of the series lamp circuits, it is necessary to raise the potential of the junction point 41 to approximately that of the positive d-c supply line 17 by circuitry which will be described later. As has been pointed out, the first lamp 11 is flashed automatically when the shutter contacts 20 are closed. By bringing the potential of the junction point 41 to approximately that of the positive d-c supply line 17, the timing capacitors 33–36 are prevented from subsequently charging through the respective resistors 37–40 and begin to discharge to reset the timing cycle. Upon closing the shutter contacts 20 the second time, all of the timing capacitors 33–36 begin to charge down, but since the time constant of the gating circuit for the SUS device 26 is shorter than the time constant for the other SUS devices, it will be gated on first. At this point the first lamp 11 is open circuited due to its filament having been burned out, and the same result would occur if the lamp 11 were open circuited due to a defect in manufacture, i.e., that the circuit automatically sequences and supplies current to the next continuous filament. Upon the SUS 26 being rendered conductive to supply current to the lamp 12, the potential of the junction point 41 is again raised to approximately that of the positive d-c supply line 17, preventing further charging of the remaining three timing capacitors 34-36. The circuit operates in sequence in this manner until the last SUS device 29 is turned on to supply current to the last lamp in the array.

Although the statistical incidence of short-circuited lamps and air bulbs is relatively low when the lamp manufacturer has good quality control, it is necessary to deal with the occasional defective lamp due to these causes if a guaranteed flash and exposure system is to be implemented. It will be shown that the application of current to the next continuous filament can be sensed, and that the flashing of a good lamp can be sensed, and that this information or the lack of it can be used to restart the time sequencing if there is a bad lamp. The circuit shown in FIG. 2 uses current sensing to obtain the required information.

The voltage drop across the current sensing resistor 21, which is connected in series between the source 19 and the parallel lamp circuits, is utilized to sense the application of current to the first continuous lamp filament, either directly through the resistor 24 or by turning on one of the SUS devices 26-29. The resistance values of the resistors 25 and 30-32 is relatively small as compared to the value of the timing resistors 37-40, a few ohms as compared to tens of thousands of ohms, so that there is a marked increase in current through the resistor 21 when one of the SUS devices 26-29 is triggered on. The resistor 24 in series with the first lamp 11 also has a low value and results in a comparable amount of current through the resistor 21. The voltage drop produced in this manner across the resistor 21 is sensed by a programmable unijunction transistor device 45 connected in series with a current limiting resistor 46 between the d-c supply terminals 17 and 18. The anode of the programmable unijunction transistor 45 is connected directly to a junction between the shutter contacts 20 and the current sensing resistor 21, while the gate electrode of the device 45 is a-c coupled through a small capacitor 43 to the other end of the resistor 21.

The programmable unijunction transistor (PUT) is a low power, triode thyristor that in reality is a small monolithic integrated circuit internally having a base-emitter connected between the anode and gate electrodes which must be forward biased in order to turn on the device. The programmable unijunction transistor thus uses a form of anode gating that is similar to the anode gating of the silicon unilateral switch in that it requires that the anode be positive with respect to the cathode, while the gate electrode is negative with respect to the anode by at least one diode drop or 0.6 volt. When the resistance value of the current sensing resistor 21 has the preferred low value of 1 ohm or so, a difference of potential of 0.6 volt through the series connected resistor 21 and capacitor 43 is not available, and it is necessary to bias the gate electrode so that the device can be triggered on with less voltage drop in the gating circuit between the anode and gate electrode, for instance, about 0.2 volt. A low cost gate biasing circuit is provided by two diodes 47 and 48 connected in series with a small resistor 49 between the d-c supply terminals 17 and 18, and a resistive voltage divider comprising two resistors 50 and 51 connected in parallel with the series diodes 47 and 48. The voltage across the two diodes 47 and 48 is equal to two diode voltage drops, approximately 1.2 volts for silicon devices, and by appropriately choosing the values of the resistors 50 and 51, a selected portion of this voltage is applied to the gate electrode of the PUT device 45 connected to their junction. It is seen that the series connected diodes 47 and 48 could be replaced by a Zener diode. This circuit application therefore takes advantage of some of the programmable characteristics of the programmable unijunction transistor. A suitable device that can be used is identified as the GE D13T1, and is described more fully in specification sheet No. 60.20, dated November 1967, available from the address given above.

When current is supplied to the next continuous lamp filament in the manner already described, the a-c coupled voltage drop across the current sensing resistor 21 is sufficient when added to the bias provided by the gate biasing network to provide the required anode-to-gate voltage drop that is necessary to render conductive the PUT 45. In the event of a defective short-circuited lamp or air bulb, it will be necessary to turn off the PUT 45 in order to restart the time sequencing to fire the next lamp in the array, i.e., to release this circuit and return it to its original condition. Accordingly, a commutation circuit is provided to commutate off the PUT 45 after a fixed interval such as 8 or 10 milliseconds, this interval being longer than the time required for a good bulb to burn out and destroy its filament. Current is still being supplied to the short-circuited lamp or air bulb after this 8 or 10 millisecond interval, however, but in view of the fact that the shutter is open for about 30 milliseconds, there is still time to start a new time cycle and fire the next bulb. The commutation circuit for the PUT 45 includes another PUT device 52 connected in series with a resistor 53 between the d-c supply terminals 17 and 18. The anode of this device 52 is connected between the shutter contacts 20 and the current sensing resistor 21. The gating circuit for the commutating PUT 52 includes a series connected timing capacitor 54 and resistor 55 likewise connected between the supply terminals 17 and 18 and having their junction connected to the gate electrode such that the timing capacitor 54 charges down when the shutter contacts 20 are closed and reaches the gating potential at a time dependent on the time constant of the circuit. As utilized in this configuration, the PUT 52 turns on when the potential at the gate electrode is about 0.6 volt less than the voltage on the anode. To complete the commutation circuit, the parallel combination of a blocking diode 56 and a resistor 57 are connected in series with the commutating capacitor 58 between the junction 59 between PUT 52 and resistor 53 on one side, and on the other side, to the junction 60 between the PUT 45 and resistor 46. This commutation circuit is conventional. When the PUT 45 is rendered conductive, the voltage across the commutating capacitor 58 rises to approximately the value of the supply voltage with the polarity indicated. Upon turning on the commutating PUT 52, the potential at the junction point 59 also rises to approximately that of the supply voltage and the diode 56 is forward biased. Since the voltage across the commutating capacitor 58 cannot change instantaneously, the potential at the junction point 60 rises to approximately twice the value of the supply voltage and reverse biases the PUT 45 for a sufficient period of time to allow it to turn off. During the commutation interval, current is still being supplied through the current sensing resistor 21, and the a-c coupling through the capacitor 43 is needed since otherwise it would not be possible to turn off the device and start a new timing cycle with current flowing.

Figure 3:
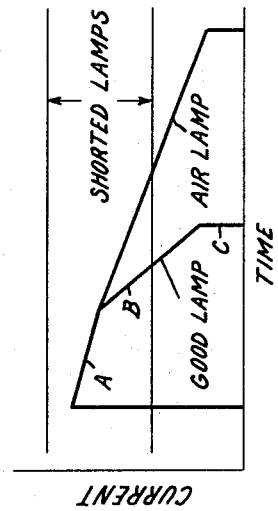
FIG. 3 shows current-time characteristics for the firing of a normal lamp, an air lamp, and a short-circuited lamp.

Current sensing is also used to sense the flashing of a normal or good lamp. FIG. 3 shows a typical current vs. time characteristic for a good lamp. Following the initial rapid increase in current through the lamp filament when current is supplied to it, the lamp current thereafter decreases and has three characteristic sections as the burning continues. At first there is a small decrease in current as the filament begins to heat up and its impedance increases (section A), then there is a more rapid decrease in current (section B) as the igniter material on the filament begins to burn and further raise its temperature. The final burning out of the filament of a good lamp is characterized by a very rapid decrease in current (section C) indicated by a substantially vertical line in FIG. 3. It is this sudden decrease in current substantially to zero that is sensed to identify the firing of a good lamp.

By contrast, observe that current is still being supplied to an air lamp and a short-circuited lamp after a good lamp has burned out. The circuitry used to sense the the firing of a good lamp is similar to those used to sense the application of current to the next continuous filament, but is located on the other side of the current sensing resistor 21 and is arranged in mirror image fashion. Briefly, another programmable unijunction transistor 63 is connected in series with a resistor 64 between the d-c supply terminals 17 and 18. The anode of the PUT 63 is connected directly to a junction between the resistor 21 and the five parallel lamp circuits, while the gate electrode is a-c coupled to the other side of the resistor 21 through a capacitor 65. A gate biasing circuit for the gate electrode of the PUT 63 provides a portion of the required gating voltage and uses the same type components as the gate biasing network for the PUT 45 which are accordingly indicated by corresponding primed numerals. For a reason to be explained later, the junction between the PUT 63 and the resistor 64 is effectively coupled to the junction point 60 through a diode 66 poled to conduct when the PUT 63 conducts. In operation, the rapid decrease in current during the final stages of burn out of a good lamp filament (section C of the curve in FIG. 3) results in a sudden decrease of the current through the current sensing resistor 21, and the relative potential at the end of the resistor 21 connected to the anode of the PUT device 63, which had been negative with respect to the potential at the other end of the resistor because of the voltage drop, suddenly increases and becomes more positive. The capacitor 65 had been charged with a polarity such that the gate electrode of PUT 63 is biased negative. The result is that when a good lamp burns out with a very rapid decrease in current at the end of its current-time characteristic, the anode of the PUT 63 becomes instantaneously more positive while the gate remains at roughly the same negative value. The PUT device 63 therefore turns on and remains conductive until the shutter contacts 20 are opened since no commutation circuit is provided for the PUT 63.

As was mentioned previously, it is necessary to raise the potential of the junction point 41 in the series RC gating circuits for the SUS devices 46–49 to approximately the potential of the positive d-c supply line 17 in order to interrupt the time sequencing of the circuit when current is supplied to the next continuous filament. It will be made more clear in the detailed explanation of the circuit to follow that this is done, i.e., the timing circuits are inhibited, whenever either one of the PUT devices 45 or 63 conducts. It is not possible, however, to directly connect together the junction points 41 and 60 since due to the voltage drops in the circuit the potential at the point 60 would be less than that of the d-c supply terminal and the RC timing circuits would then continue to charge although at a much lower rate. Instead, the junction point 60 is connected through a resistor 67 to the base of an n-p-n transistor 68 that is associated with a p-n-p transistor 69 as a high gain complementary amplifier pair. More particularly, the emitter of the transistor 68 is connected directly to the negative d-c supply terminal 18 while its collector is connected through a pair of voltage divider resistors 70 and 71 to the emitter of the transistor 69, the base of this transistor being coupled to the junction of the resistors 70 and 71. The collector of the transistor 69 is connected directly to the junction point 41 and through a resistor 42 to the negative d-c supply terminal 18. The end of the resistor 21 adjacent the shutter contacts 20 is coupled with the emitter lead of the transistor 69. With this arrangement, a turn-on potential is applied to the n-p-n transistor 68 whenever either one of the PUT devices 45 or 63 conducts, and the turn-on of the transistor 68 applies through the voltage divider resistors 70, 71 a negative potential to the base of the n-p-n transistor 69, likewise turning it on. The supply potential then appears at the emitter of the transistor 69, and the voltage at the junction point 41 differs from the supply voltage only by the saturation drop of the transistor 69 which is relatively small. Consequently, the timing of the gating circuits for the SUS devices 26–29 is effectively interrupted and the timing capacitors 33–36 begin to discharge. If, on the other hand, neither of the PUT devices 45 or 63 is conducting, then there is no turn-on potential at the base of the transistor 68, and both of the transistors 68 and 69 are non-conductive, and the time sequencing is not interrupted.

The operation of the guaranteed flash sequential flashing circuit for a linear array of photoflash lamps will be reviewed first for a normal sequence operation assuming that all of the lamps 11–15 are good lamps or open circuited or burned out lamps. The circuit is energized by the closing of the shutter contacts 20 initiated by the camera user when he wishes to take a flash exposure. The operation of the circuit, incidentally, is not affected by contact bounce since this merely supplies power to the circuit on a time ratio control basis. Upon the closing of the shutter contact 20, the battery 19 supplies current through the current sensing resistor 21 to the first or automatically operating lamp circuit comprising the resistor 24 and lamp 11. The resulting voltage drop across the current sensing resistor 21 is a-c coupled through the capacitor 43 to the gate electrode of the programmable unijunction transistor device 45, biasing the gate electrode negative with respect to the anode. This gate bias is supplementary to the bias provided by the voltage divider comprising the resistors 50 and 51 connected across the series combination of the two diodes 47 and 48 which function in the capacity of a Zener diode to provide a fixed voltage drop across the voltage divider, a desired portion of which is applied to the gate electrode by the connection of the gate with the junction between the resistors 50 and 51. Since the voltage at the gate electrode is now negative with respect to the anode by an amount exceeding one diode voltage drop, or about 0.6 volt, the PUT device 45 is rendered conductive. A positive polarity turn-on potential is then coupled through the resistor 67 to the base of the transistor 68 of the transistor pair 68, 69, turning on both of these transistors. With the transistor 69 turned on, the potential at the junction point 41 is raised to approximately that of the source 19 by means of a connection of the emitter of the transistor 69 with the junction between the shutter contacts 20 and the resistor 21. Consequently, the charging of the RC timing circuits comprising the respective capacitors 33–36 and resistors 37–39 for the silicon unilateral switch devices 26–29 is effectively stopped or interrupted. When the first lamp 11 burns out, the rapid decrease in current as the filament burns out (section C of the current-time characteristic, FIG. 3) is sensed and indicated by the programmable unijunction transistor 63. Since the anode of the PUT 63 is connected to the other end of the current sensing resistor 21, while its gate electrode is a-c coupled through capacitor 65 to the first or opposite end of the resistor 21, the voltage on the capacitor 65 remains approximately the same whereas the voltage at the anode of the device increases in a relative positive sense when there is a rapid reduction of current through the resistor 21. The PUT 63 is in this manner rendered conductive when the lamp 11 is flashed, assuming that it is a good lamp. With the PUT 63 turned on, a turn-on potential for the transistor 68 is also provided through the now forward biased diode 66. At this instant, both PUT devices 45 and 63 are conducting, as a result of which the transistor pair 68, 69 are also turned on, thereby stopping the sequencing of the circuit and preventing the flashing of other lamps in the array.

In the meantime, however, the commutation circuit for the PUT 45 has been energized and operates to commutate off the PUT 45 after a fixed interval of time of about 8 to 10 milliseconds during which a good lamp would have already burned out, turning on PUT 63. In the gating circuit for the commutating PUT device 52, the timing capacitor 54 charges down until the difference of potential between the anode and gate electrodes exceeds a diode drop, turning on the PUT 52. The voltage across the commutating capacitor 58 has already charged to approximately that of the supply voltage through the PUT 45 and resistor 53. When the PUT 52 becomes conductive, the potential of the commutating capacitor 58 is applied across the anode and cathode terminals of the PUT 45, reverse biasing it so that it begins to turn off. Diode 66 blocks to prevent commutation of PUT 63. With the PUT 45 fully turned off then, PUT 63 remains conducting. Consequently, a turn-on potential continues to be applied to the transistor pair 68, 69, preventing further sequencing of the circuit. This circuit condition prevails until the shutter contacts 20 are opened either by the mechanism within the camera, or by the release of manual pressure to the shutter release by the photographer.

The second time the camera contacts 20 are closed to take another exposure, all of the RC timing gating circuits for the SUS devices 26–29 begin to charge at the same time, however, the gating circuit for the SUS device 26 in series with the second lamp 12 (capacitor 33 and resistors 37 and 42) has a shorter time constant than the others so that the SUS 26 is rendered conductive first. The normal sequence now continues as before. The supplying of current to the next continuous lamp filament is sensed by the current through the current sensing resistor 21 and causes the PUT 45 to be turned on. Transistor pair 68, 69 are now changed from their non-conducting state to a conducting state, thereby elevating the voltage at the junction point 41 and interrupting the charging of the timing capacitors 34, 35, and 36 for the remaining three SUS devices 27–29, and allowing them to discharge. The proper flash of lamp 12 is sensed by the rapid reduction of current through the current sensing resistor 21 which acts to turn on the PUT 45. Although PUT 45 is commutated off by PUT 52 after the desired interval of time, PUT 63 remains on to keep on the transistor pair 68, 69 and interrupt the sequencing until the shutter contacts 20 are opened. If the first lamp 11 had been an open circuited lamp or an already burned out lamp, then it is obvious that the automatic sequencing to the next lamp 12 would have occurred. In similar manner, the SUS devices 27, 28 and 29 are rendered conductive in that sequence on subsequent closings of the shutter contacts 20. Inasmuch as the time constants of the gating circuits for the SUS devices 26–29 are in the range of hundreds of microseconds whereas a shutter for a flash exposure is open for as much as 30 milliseconds, it is clear that the fifth lamp 15 would have been flashed within 1 millisecond or so, preventing loss of the picture, even if all of the other four lamps 11–14 were open circuited or burned out previously.

The sequence of operation when one of the lamps 11–15 is a short-circuited lamp or an air lamp, hereinafter called the fault sequence, is the same for both of these types of defects. The circuit will burn out an air bulb, although this requires a longer period of time than for the normal good bulb. A short circuit in a lamp occurs after the flashing of the filament, and the lamp appears to the circuit as a good lamp. However, the subsequent short circuit affects the firing of succeeding lamps since there is now an impedance in parallel with the lamp filament to be fired, reducing the total impedance and raising the current level. The greater the impedance of the short-circuited lamp, after becoming short circuited, the less of a problem is created since the short circuit current is lower. With either the short-circuited lamp or the air lamp, the circuit operation begins as before since current is applied to the next continuous filament as a result of which the PUT device 45 turns on. Transistors 68 and 69 are also conducting, thus interrupting the timing of the gating circuits. However, neither the short-circuited lamp nor the air lamp exhibit the rapid decrease in current (section C, FIG. 3) within 8 milliseconds or so that is the characteristic of the burning out of a good lamp, so that PUT 63 is not rendered conductive. As before, the commutation circuit for the PUT device 45 is operating and turns off this thyristor after the predetermined interval in which a good bulb would have burned out so that PUT 63 would then be on. But in the fault sequence PUT 63 is not turned on, and when PUT 45 is commutated off, there is no turn-on potential for the transistor pair 68, 69 and they turn off. The timing capacitors 33–36, which had discharged during the period PUT 45 was conducting, now begin to charge down again and consequently restart the timing sequence. In the new timing cycle when one of the non-conducting SUS devices 26–29 is rendered conductive and supplies current to the next continuous filament, the increase in current is sensed by the current sensing resistor 21, again turning on the PUT 45. Thus, transistor pair 68, 69 conducts and the sequencing is again interrupted. Assuming that the next lamp to which current had been supplied is a good lamp, then the burning out of the good lamp is sensed by the PUT 63 which is rendered conductive. It will be noted that the commutating PUT 52 for the device 45 remains conducting since in this circuit embodiment there is nothing to turn it off (note the blocking diode 56). When the next lamp after a bad lamp is a good lamp, then the sequence of operation ends with all three PUT devices 52, 45, and 63 conducting, and the sequencing is interrupted. Upon opening the shutter contacts 20, all the thyristor devices are commutated off. The guaranteed flash and exposure are thus assured with the reservation that it operates to override or bypass one short circuited lamp (not two in a row) or air bulb. This is believed to be a realistic provision since the statistical incidence of these types of defective bulbs is relatively low. There may, of course, be any number of open circuited or already burned out lamps.

In addition to supplying the necessary circuit functions to implement a guaranteed flash and exposure sequential flashing system for an array of photoflash lamps, an outstanding advantage of the FIG. 2 circuit is that is can be fabricated as a monolithic or hybrid integrated circuit. It may be desirable to provide the one ohm current sensing resistor 21 as a discrete component, in view of the power dissipated by it. Also, it would be necessary to change the value of resistor 21 for different batteries or cameras. But the remainder of the circuit components are readily adapted to be fabricated in monolithic integrated circuit form. The circuit is thus susceptible to be manufactured at relatively low cost, and to enjoy the advantages of smallness of size and reliability that are common to all integrated circuits.

Several modifications of the FIG. 2 circuit will occur to those skilled in the art. For example, it is evident that the anode gated thyristor devices, namely, the silicon unilateral switches 26–29 and the programmable unijunction transistors 45, 52, and 63, can be replaced by equivalent thyristor arrangements or by a pair of transistors connected together to have a latching characteristic. Furthermore, it is possible with appropriate circuit modifications to use cathode type gated thyristors such as the silicon controlled rectifier. With cathode gated thyristors, the circuits are reversed since with these devices the cathodes are connected together in common rather than the anodes. The physically separable shutter contacts 20 can be replaced by other contact systems such as a solid state switch which is rendered conductive upon actuating a shutter release and is commutated off after a specified period of time, such as 30 or 40 milliseconds.

A modification of the guaranteed flash circuit of FIG. 2 that employs light sensing to sense a flashed lamp, rather than current sensing, is illustrated in FIG. 4. This involves replacing the PUT 63 by a thyristor device that is activated by light, such as the light activated silicon controlled rectifier. The light activated silicon controlled rectifier is a four-layer thyristor similar in structure to the regular silicon controlled rectifier, however, it is gated into conduction by the incident radiant energy within the spectral bandwidth of silicon that impinges on and penetrates into the silicon lattice and releases a considerable number of hole-electron pairs. The resulting current is sufficient to trigger on the device, provided that the anode electrode is biased positive relative to the cathode electrode. Although a gate electrode is commonly provided with the device, the gate electrode is not connected in this circuit application. Thus, the gate biasing network components 47'–51', as well as the gating coupling capacitor 65 used in FIG. 2 are not required. The light output of a flashed lamp has approximately a bell curve distribution, and the LASCR 72 can be arranged to trigger on at approximately the half power point of the rising half of the curve. This occurs within about 8 milliseconds of the flashing of a lamp. Another circuit change is that, in the commutating circuit for the PUT 45, the blocking diode 56 and parallel resistor 57 are eliminated.

The operation of the FIG. 4 circuit will be described only as to its differences as compared to FIG. 2. Upon the flashing of a good lamp or a lamp that subsequently becomes short circuited, there is a usable light output that is sensed by the LASCR 72 and results in rendering it conductive. Thus, the operation follows the normal sequence in which the commutating PUT 52 is triggered on and initiates commutation of the PUT 45. LASCR 72 remains on, there being no commutating circuit, and supplies a turn-on potential to the transistor pair 68, 69 to stop the timing of the gating circuits and interrupt the sequencing. When the lamp to which current is supplied is an air bulb, the PUT 45 turns on but the LASCR 72 is not rendered conductive since there is no flash. After 8 or 10 milliseconds, PUT 52 conducts and initiates the commutation of PUT 45. The instant the PUT 45 turns off, transistor pair 68, 69 are also biased off and the sequencing begins again. The application of current to the next continuous filament is sensed and indicated by the turn-on of PUT 45. Transistor pair 68, 69 accordingly becomes conductive and stops the sequencing of the circuit. Assuming that the second lamp fired is a good lamp, there is no loss of the exposure. An additional feature obtained when diode 56 is eliminated is that when PUT 45 is rendered conductive the second time, PUT 52 is commutated off so that the timing capacitor 54 in its gating circuit is discharged. Consequently the timing of this gating circuit starts again and triggers on PUT 52 a second time after 8 to 10 milliseconds. PUT 45 is therefore commutated off a second time. Should the second lamp to which current was supplied be defective and not produce a useful light output, there is still time to flash a third lamp and prevent loss of the exposure.

In the FIG. 2 circuit, it will be noted that the blocking diode 56 and parallel connected resistor 57 can be removed so that the same desirable feature of the FIG. 4 circuit is obtained, namely that a third lamp can be fired in the event that the first two lamps attempted to be flashed are defective, either because they are short-circuited lamps or air lamps.

The usual transparent envelope that encloses the array of lamps can be used as a light pipe to transmit the flash of light to a light sensing device mounted adjacent to its lower edge, which could be the light activated thyristor 72. If it is not convenient to mount the LASCR 72 directly beneath the edge of the envelope, then a light pipe can be used to transmit the flash of light from the edge of the transparent envelope to the remotely located light sensor.

In summary, fast acting solid state sequential flashing circuits for a linear array of photoflash lamps employ high speed static switching and have guaranteed or warranteed flash and exposure capability. The flashing of the lamps is actuated and coordinated with the shutter release that causes the camera shutter to open and make an exposure, and lamps that are defective due to open circuits, short circuits, or air leaks are electronically sensed and by-passed to flash the next good lamp while the shutter is still open to prevent loss of the exposure. Open circuited bulbs are automatically skipped over, but current sensing techniques or a combination of current sensing and light sensing are used to sense a short-circuited lamp or air lamp and restart the time sequencing to flash the next lamp.

While the invention has been particularly shown and described with regard to several preferred embodiments thereof, it will be understood by those skilled in the art that the foregoing and other changes in form and details may be made therein without departing from the spirit and scope of the invention.

What we claim as new and desire to secure by Letters Patent of the United States is:

1. A solid state guaranteed flash circuit for sequentially flashing an array of photoflash lamps that can include defective lamps comprising a plurality of lamp circuits each including a solid state switching means in series circuit relationship with a pair of lamp terminals for receiving a photoflash lamp, said lamp circuits being connected parallel to one another between a pair of power supply terminals for connection with circuit energizing means that energizes said flash circuit with electrical potential in time relation to the opening of a camera shutter, control means for rendering conductive said solid state switching means to supply current to their respective lamps in a predetermined sequence following energization of the flash circuit during a timing cycle shorter than the intended shutter open interval, first sensing means for sensing the application of current to the first lamp in the array having a continuous filament, second sensing means for sensing the flashing of a good lamp that produces a usable light output, inhibit means interconnected with said first and second sensing means and said control means and responsive to either of said first and second sensing means for inhibiting said control means and interrupting the sequencing of said solid state switching means, and release means interconnected with said second sensing means and said control means and operative when current is supplied to a defective lamp to release said inhibiting of said control means after a predetermined interval of time sufficient for said second sensing means to sense the flashing of a good lamp, whereby the sequencing can be recommenced and current supplied to the succeeding continuous filament in the array while the shutter remains open, thereby preventing loss of an exposure.

2. A circuit as defined in claim 1 wherein said first sensing means comprises a current sensing impedance connected in series between one of said power supply terminals and said parallel lamp circuits, and further includes solid state switching means connected to a junction between said current sensing impedance and supply terminal, and said second sensing means comprises solid state switching means connected to a junction between said impedance and parallel lamp circuits.

3. A circuit as defined in claim 1 wherein said first sensing means comprises a current sensing resistor connected in series between one of said power supply terminals and said parallel lamp circuits, and further includes a first solid state thyristor device having a load terminal connected to a junction between said resistor and supply terminal and a gating circuit connected across said resistor, said second sensing means comprises a second solid state thyristor device having a load terminal connected to a junction between said resistor and parallel lamp circuits and a gating circuit connected across said resistor, and said means for releasing said first sensing means comprises commutation means for turning off said first thyristor device after the predetermined interval of time sufficient for said second thyristor device to turn on and sense the flashing of a good bulb.

4. A circuit as defined in claim 1 wherein said first sensing means comprises a current sensing resistor connected in series between one of said power supply terminals and said parallel lamp circuits, and further includes a first solid state thyristor device having a load terminal connected to a junction between said resistor and supply terminal and a gating circuit connected across said resistor, said second sensing means comprises a light sensing solid state device effectively coupled between said supply terminals, and said means for releasing said first sensing means comprises commutation means for turning off said first thyristor device after the predetermined interval of time sufficient for said light sensing device to turn on and sense the flashing of a good lamp.

5. A solid state guaranteed flash circuit for sequentially flashing an array of photoflash lamps that can include defective lamps comprising a plurality of lamp circuits each including a solid state thyristor device in series circuit relationship with a pair of lamp terminals for receiving a photoflash lamp, said lamp circuits being connected parallel to one another between a pair of power supply terminals for connection across a source of unidirectional electric potential and in series with a shutter switch that closes to energize the circuit following actuation of the shutter release, gating means comprising timing means including series connected capacitor and resistor means for rendering conductive said thyristor devices to supply current to their respective lamps in a predetermined sequence following the closing of the shutter switch during a timing cycle shorter than the intended shutter opening interval, first current sensing means including a solid state thyristor device that turns on to indicate the application of current to the first lamp in the array having a continuous filament, second sensing means including a solid state thyristor device that turns on to indicate the flashing of a good lamp, commutation means for turning off the first sensing means thyristor after a predetermined interval of time sufficient for the second sensing means thyristor to be rendered conductive, and inhibit means actuated by either of said sensing means thyristors for interrupting and resetting said timing means, said inhibit means being released after the predetermined interval of time following the application of current to a defective lamp, whereby said timing means starts a new timing cycle and current is supplied to the succeeding continuous lamp filament in the array while the shutter remains open, thereby preventing loss of an exposure.

6. A circuit as defined in claim 5 including an additional directly flashable lamp circuit comprising a pair of lamp terminals effectively coupled across said power supply terminals.

7. A circuit as defined in claim 5 wherein said first sensing means includes a resistor connected in series between one of said power supply terminals and said parallel lamp circuits, and said sensing means thyristors are anode gated thyristors having anode and gate electrodes connected respectively in mirror image fashion in series with said resistor and a capacitor, and said lamp circuit thyristors are anode gated thyristors.

8. A circuit as defined in claim 7 wherein said inhibit means comprises solid state switching means connected to be rendered conductive when either of said sensing means thyristors are turned on, said solid state switching means being further coupled with one of said power supply terminals and said timing means to prevent further charging thereof and discharge said capacitor means.

9. A circuit as defined in claim 8 wherein said sensing means thyristors are programmable unijunction transistors, said lamp circuit thyristors are silicon unilateral switches, and said solid state switching means comprises a pair of coupled transistors.

10. A circuit as defined in claim 5 wherein said first sensing means includes a resistor connected in series between one of said power supply terminals and said parallel lamp circuits, and said sensing means thyristors are anode gated programmable unijunction transistor devices having anode and gate electrodes connected respectively in mirror image fashion in series with said resistor and a capacitor, each further having a biasing network for the gate electrode comprising a pair of diodes in series with a resistor, and a resistive voltage divider connected across the pair of series diodes, a junction of said resistive voltage divider being connected to its respective gate electrode, and said lamp circuit thyristors are anode gated thyristors.

11. A circuit as defined in claim 5 wherein said first current sensing means additionally includes a current sensing resistor connected in series between one of the power supply terminals and said parallel lamp circuits, and said first sensing means thyristor is an anode gated thyristor having anode and gate electrodes coupled across said resistor and a series connected capacitor, and said second sensing means thyristor is a light actuated thyristor that senses the flashing of good lamps.

12. A method of sequentially flashing an array of photoflash lamps to obtain a guaranteed flash and exposure comprising the steps of initiating the sequencing of a plurality of parallel connected lamp circuits to sequentially supply current to their respective photoflash lamps in a timing cycle shorter than a camera shutter opening interval, sensing by means of a first sensor the application of current to the first continuous lamp filament in the array, sensing by means of a second sensor for the flashing of a good lamp, interrupting the sequencing in response to sensing by either of said first and second sensors, and continuing said sequency after a predetermined interval of time sufficient for the second sensor to sense the flashing of a good lamp.

13. A method as defined in claim 12 comprising the additional steps of recommencing the sequencing of said parallel lamp circuits to supply current to the next continuous lamp filament in the array, sensing by means of the released first sensor the application of current to the aforementioned next continuous lamp filament, sensing by means of the unoperated second sensor for the flashing of a good lamp, and interrupting the sequencing a second time in response to sensing by either of said first and second sensors.

14. A method as defined in claim 13 including the additional steps of closing a shutter switch to energize the circuit and initiate the sequencing of said parallel lamp circuits, and opening the shutter switch to de-energize the circuit and return said first and second sensors to their original condition.

* * * * *